(12) United States Patent
Handshaw et al.

(10) Patent No.: US 11,308,292 B2
(45) Date of Patent: Apr. 19, 2022

(54) SCANNING DEVICE ASSEMBLIES INCLUDING SCANNING DEVICES AND ASSOCIATED BASES

(71) Applicant: ZEBRA TECHNOLOGIES CORPORATION, Lincolnshire, IL (US)

(72) Inventors: Darran Michael Handshaw, Sound Beach, NY (US); Steven D. Sieckowski, Port Jefferson, NY (US); Edward Anthony Hackett, Surbiton (GB); Wancheng Zhao, St. James, NY (US); Jason Y. Potter, New York, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 75 days.

(21) Appl. No.: 16/555,750

(22) Filed: Aug. 29, 2019

(65) Prior Publication Data

US 2021/0064830 A1 Mar. 4, 2021

(51) Int. Cl.
*G06K 7/08* (2006.01)
*G06K 7/14* (2006.01)
*G06K 7/10* (2006.01)

(52) U.S. Cl.
CPC ............. *G06K 7/084* (2013.01); *G06K 7/109* (2013.01); *G06K 7/1408* (2013.01); *G06K 7/1443* (2013.01)

(58) Field of Classification Search
CPC ............ G06K 7/00; G06K 7/08; G06K 7/082; G06K 19/00

USPC .............. 235/449, 439, 375, 462.41, 462.43, 235/462.45
See application file for complete search history.

(56) References Cited

U.S. PATENT DOCUMENTS

| | | | |
|---|---|---|---|
| 2007/0017997 A1* | 1/2007 | Talley .................... | G06K 7/109 235/462.43 |
| 2012/0018516 A1* | 1/2012 | Gao ...................... | G06K 7/1417 235/454 |
| 2012/0054048 A1* | 3/2012 | Richardson .......... | G07G 1/0081 705/20 |
| 2012/0193422 A1* | 8/2012 | Franz ................... | G08B 13/246 235/462.1 |
| 2019/0220059 A1* | 7/2019 | Miles .................... | G06F 1/1632 |

* cited by examiner

*Primary Examiner* — Edwyn Labaze
(74) *Attorney, Agent, or Firm* — Yuri Astvatsaturov (57) ABSTRACT

Scanning device assemblies including scanning devices and associated bases. An example scanning device assembly includes a scanning device including a housing, an optical imaging assembly disposed in the housing, and a base. The optical imaging assembly having an imaging field of view (FOV). The optical imaging assembly configured to capture one or more images of an environment appearing within the FOV. The base includes a base coupling portion to mate with a housing portion of the scanning device for supporting the scanning device during operation. The scanning device assembly includes a magnetic-rotational coupling formed between the scanning device and the base and allowing the scanning device to rotate relative to the base, while the base maintains support of the scanning device.

20 Claims, 8 Drawing Sheets

SCANNING DEVICE ASSEMBLIES INCLUDING SCANNING DEVICES AND ASSOCIATED BASES

FIELD OF THE DISCLOSURE

The present patent relates generally to scanning device assemblies and, in particular, relates to scanning device assemblies including scanning devices and associated bases.

BACKGROUND

Barcode and other scanning devices generally capture images within a given field of view (FOV). In some instances, barcode readers are known to be used in multi-mode environments where the same reader can be used in a handheld mode. As such, there are various situations where the reader may need to be held by hand and moved around, or it may be preferable to have the reader reside on a stable surface such as a table or countertop.

Accordingly, there is a need for improved scanning device assemblies.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

In a first example, an example scanning device assembly includes a scanning device including a housing, an optical imaging assembly disposed in the housing, and a base. The optical imaging assembly has an imaging field of view (FOV). The optical imaging assembly is configured to capture one or more images of an environment appearing within the FOV. The base includes a base coupling portion to mate with a housing portion of the scanning device for supporting the scanning device during operation. The scanning device assembly includes a magnetic-rotational coupling formed between the scanning device and the base and allows the scanning device to rotate relative to the base, while the base maintains support of the scanning device.

In a variation of the first example, a sensor is included that is configured to generate a first signal in response to the sensor being proximate the magnet and that is configured to generate a second signal in response to the sensor being distal to the magnet. In the variation of the first example, a processor is coupled to the sensor that is to cause the scanning device to be in a first operational mode in response to the processor accessing the first signal and that is to cause the scanning device to be in a second operational mode in response to the processor accessing the second signal. In a variation of the first example, the magnetic-rotational coupling includes a first magnet and a plurality of second magnets. The plurality of second magnets are positioned in a spaced manner to provide a plurality of magnetically engaged, angularly differentiated positions couplable with the first magnet over a range of rotational movement of the scanning device. In a variation of the first example, the scanning device includes an energy storage and the base includes a charger adapted to charge the energy storage. In a variation of the first example, the scanning device assembly further includes a communication unit configured to allow communication between the scanning device and the base. In a variation of the first example, the scanning device assembly includes a lock formed between the scanning device and the base. The lock is configured to restrict relative movement between the scanning device and the base in at least one direction.

In a variation of the first example, the base includes a handle having a trigger. In a trigger mode of the scanning device, the trigger is actuatable to cause the optical imaging assembly to capture the one or more images corresponding to the environment appearing within the FOV. In a variation of the first example, the housing portion includes a receptacle and the base coupling portion includes a protrusion. The protrusion is receivable within the receptacle to mate and rotationally couple the base and the housing.

In a second example, a barcode reader assembly for capturing at least one image of an object appearing in a field of view (FOV) includes a barcode reader, a stand, and a magnetic coupling. The stand is adapted to nest with the barcode reader. The magnetic coupling is formed between the barcode reader and the stand. The barcode reader is magnetically coupled to the stand such that the barcode reader is rotatable relative to the stand.

In a variation of the second example, the stand includes a concave-shaped surface and the barcode reader includes a convex-shaped surface. The concave-shaped surface is adapted to receive the convex-shaped surface.

In a variation of the second example, the magnetic coupling includes a magnet or a ferromagnetic material carried by the barcode reader and the other of the magnet or the ferromagnetic material is carried by the stand. The barcode reader assembly also includes a sensor. The sensor is configured to generate a first signal in response to the sensor being proximate the magnet and is configured to generate a second signal in response to the sensor being distal to the magnet. The bar code reader assembly includes a processor coupled to the sensor. In response to the processor accessing the first signal, the processor is configured to cause the barcode reader to be in a first operational mode and, in response to the processor accessing the second signal, the processor is configured to cause the barcode reader to be in a second operational mode.

In a variation of the second example, the magnetic coupling includes a first magnet and a plurality of second magnets. The first magnet is carried by one of the barcode reader and the stand and the plurality of second magnets are carried by the other of the barcode reader and the stand. Movement of the barcode reader relative to the base allows the first magnet to couple with different ones of the plurality of second magnets to change the rotational position of the barcode reader.

Figure 1:
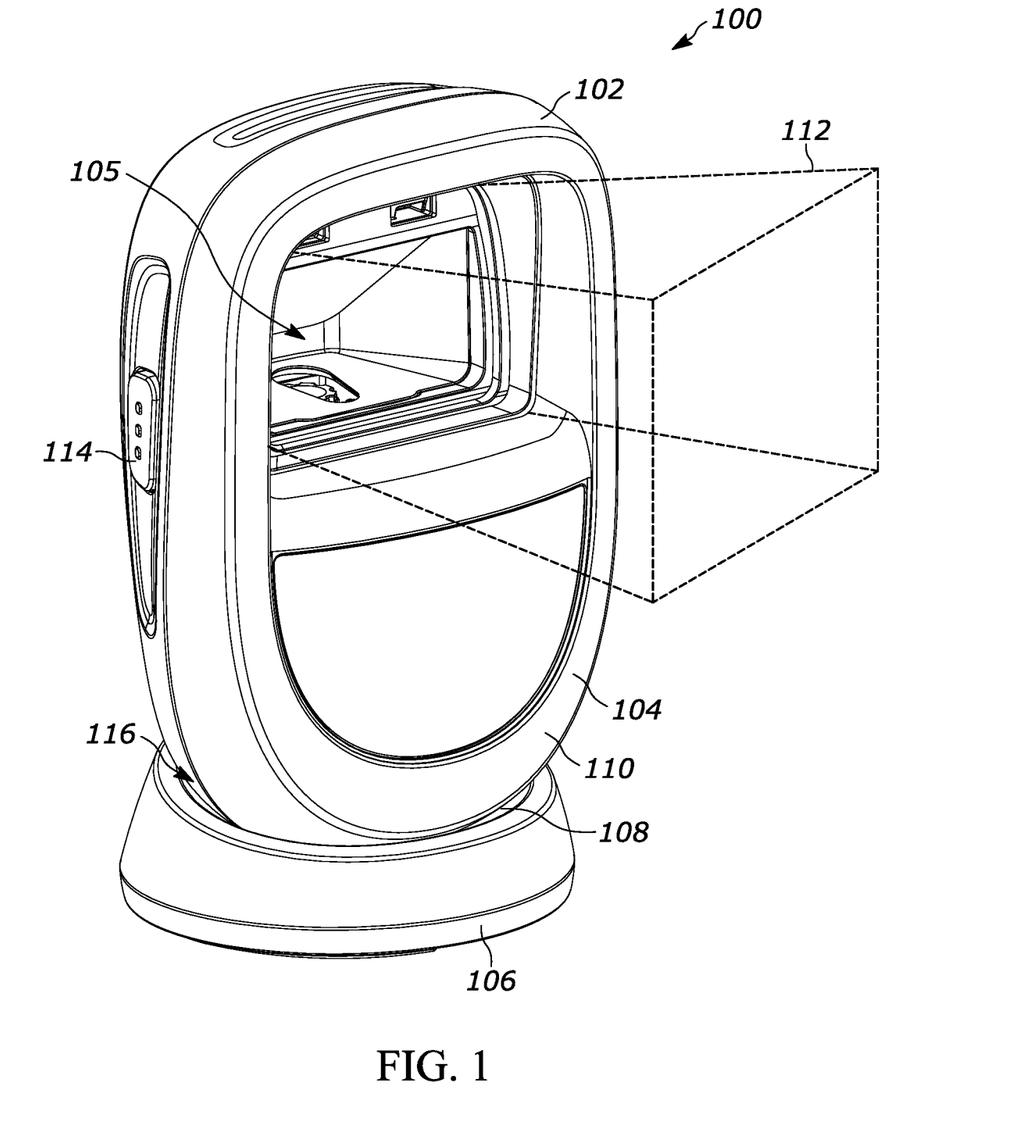
FIG. 1 is an isometric view of a scanning device assembly in accordance with a first example of the present disclosure.

Referring now to the drawings, FIG. 1 is an isometric view of a scanning device assembly 100 in accordance with a first example of the present disclosure. The scanning device assembly 100 may be referred to as a barcode assembly. The scanning device assembly 100 includes a scanning device 102 having a housing 104 and an optical imaging assembly 105. The scanning device assembly 100 also includes a base 106 having a base coupling portion 108. The scanning device 102 may be referred to as a barcode reader and the base 106 may be referred to as a stand. In the example shown, the housing 104 includes a housing portion 110 that mates with the base coupling portion 108 in a manner that supports the scanning device 102 during operation. Put another way, the base 106 is adapted to nest with the scanning device 102.

The optical imaging assembly 105 is disposed within the housing 104 and is configured to capture one or more images of an environment appearing within a field of view (FOV) 112 of the optical imaging assembly 105. In some examples, the environment within the FOV 112 may include a product having a barcode. The scanning device 102 may be operable in a trigger mode and a presentation mode. In the trigger mode of the scanning device 102, a trigger 114 of the scanning device 102 may be actuated (e.g., pressed) to cause the optical imaging assembly 105 to capture the image. In the presentation mode of the scanning device 102, the optical imaging assembly 105 may capture an image when an object is presented within the FOV 112.

Figure 2:
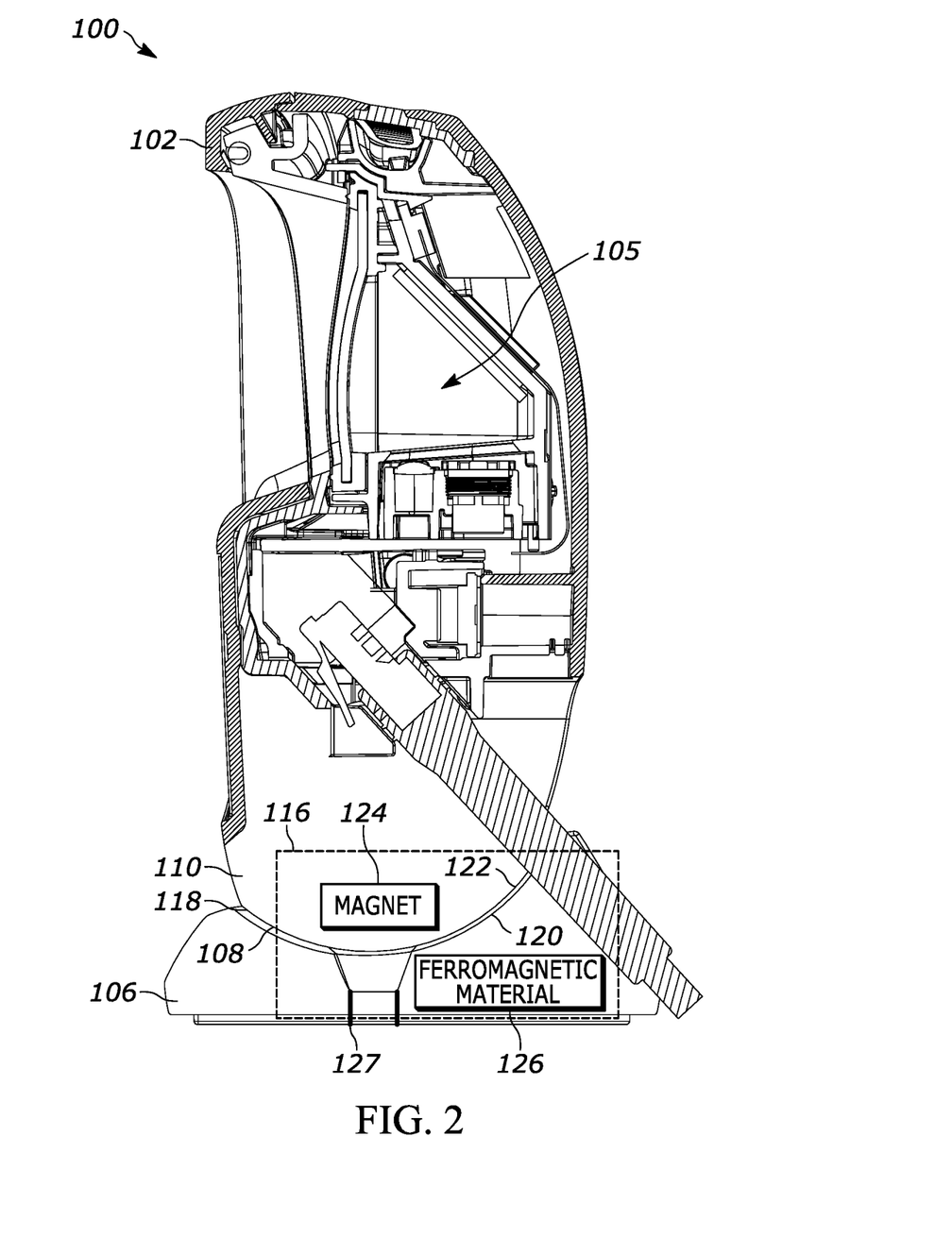
FIG. 2 illustrates a cross-sectional view of the scanning device assembly of FIG. 1.

The scanning device assembly 100 also includes a magnetic-rotational coupling 116 (the magnetic rotational coupling 116 is better shown in FIG. 2). The magnetic-rotational coupling 116 is formed between the housing 104 and the base 106 and allows the scanning device 102 to rotate relative to the base 106 while the base 106 maintains support of the scanning device 102.

FIG. 2 illustrates a cross-sectional view of the scanning device assembly 100 of FIG. 1. In the example shown, the base coupling portion 108 has a receptacle 118 that receives the housing portion 110 of the scanning device 102 to mate and rotationally couple the base 106 and the scanning device 102. The coupling formed between the receptacle 118 and the housing portion 110 may provide for a reduced gap between the scanning device 102 and the base 106.

In the example shown, the receptacle 118 is formed by a curved upward facing surface 120 of the base 106 that corresponds to a curved downward facing surface 122 of the housing 104. The upward facing surface 120 is adapted to receive the downward facing surface 122. The upward facing surface 120 is concave and the downward facing surface 122 is convex. In an example, the upward facing surface 120 is a socket or a cavity and the downward facing surface 122 is a portion of a ball or spheroid that is receivable by the cavity of the base 106. As an alternative, the upward facing surface 120 may be convex and the downward facing surface 122 may be concave (see, for example, FIG. 8). Other arrangements may prove suitable.

When the housing 104 mates with the base 106, the magnetic-rotational coupling 116 is formed between a magnet 124 and ferromagnetic material 126. The magnetic-rotational coupling 116 may allow the scanning device 102 to be selectively removed from the base 106 and may allow the scanning device 102 to rotate relative to the base 106 while remaining coupled (e.g., magnetically coupled) to the base 106. The ferromagnetic material 126 may be covered by a material such as, for example, plastic.

In the example shown, scanning device 102 carries the magnet 124 and the base 106 carries the ferromagnetic material 126. In another example, the scanning device 102 carries the ferromagnetic material 126 and the base 106 carries the magnet 124 (see, for example, FIGS. 3, 4). While one magnet 124 and one piece of ferromagnetic material 126 are shown, one or more magnets 124 may be carried by either the scanning device 102 and/or the base 106 (see, for example, FIG. 4) and/or one or more pieces of ferromagnetic material. A portion or the entire base 106 and/or the scanning device 102 may include a ferromagnetic material. For example, the base 106 may be cast from a ferromagnetic material such as steel.

A hole 127 is defined by the base 106. In some examples, a fastener (not shown) may extend through the hole 127 of the base 106 and be coupled to a surface (e.g., a countertop) to affix the base 106 to the surface. Other methods of coupling the base 106 to a surface may prove suitable. For example, adhesive may be used to couple the base 106 to another surface. The hole 127 of the base 106 may alternatively be used for drainage. Other methods to provide drainage for the base 106 may prove suitable. For example, the base 106 may include additional holes.

Figure 3:
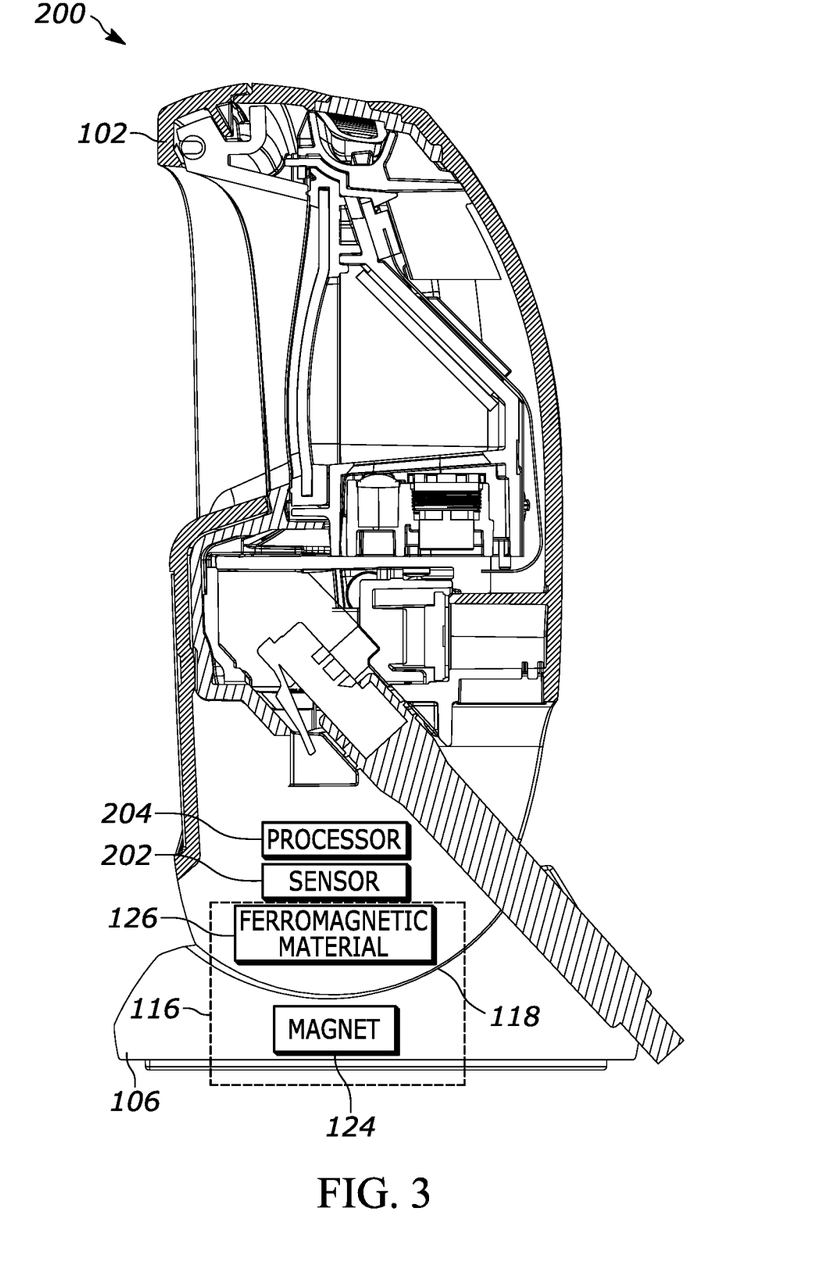
FIG. 3 illustrates a cross-sectional view of another scanning device assembly in accordance with a second example of the present disclosure.

FIG. 3 illustrates a cross-sectional view of another scanning device assembly 200 in accordance with a second example of the present disclosure. The scanning device assembly 200 of FIG. 2 is similar to the scanning device assembly 100 of FIG. 2. In contrast, the magnetic-rotational coupling 116 of FIG. 3 is arranged such that the magnet 124 is carried by the base 106 and the ferromagnetic material 126 is carried by the scanning device 102. Additionally, in contrast to the scanning device assembly 100 of FIG. 1, the scanning device 102 of FIG. 3 includes a sensor 202 and a processor 204. Alternatively, the sensor 202 and/or the processor 204 may be carried by the base 106. The sensor 202 and the processor 204 are electrically and/or communicatively coupled. The sensor 202 may be a magnetic sensor such as, for example, a Hall effect sensor or a Reed switch. Other sensors may prove suitable. One or more processors may be provided.

In the example shown, the sensor 202 is configured to generate a first signal when the sensor 202 is proximate the magnet 124 and configured to generate a second signal when the sensor 202 is distal to the magnet 124. The sensor 202 may be proximate to the magnet 124 when the housing portion 110 of the scanning device 102 is receivable by the receptacle 118 of the base 106. The sensor 202 may be distal to the magnet 124 when the scanning device 102 is removed from the receptacle 118 by, for example, an operator.

The processor 204 is arranged to access the signals generated by the senor 202 and to cause the scanning device 102 to be in a corresponding operational mode, accordingly. In response to the processor 204 accessing the first signal indicative of the scanning device 102 being proximate to the magnet 124, the processor 204 may cause the scanning device 102 to be in the presentation mode. In response to the processor 204 accessing the second signal indicative of the scanning device 102 being distal to the magnet 124, the processor 204 may cause the scanning device 102 to be in the trigger mode. Thus, the processor 204 may cause the scanning device 102 to automatically change between a trigger mode (e.g., a handheld scanning mode) and a presentation mode based on the relative location between the scanning device 102 and the base 106.

Figure 4:
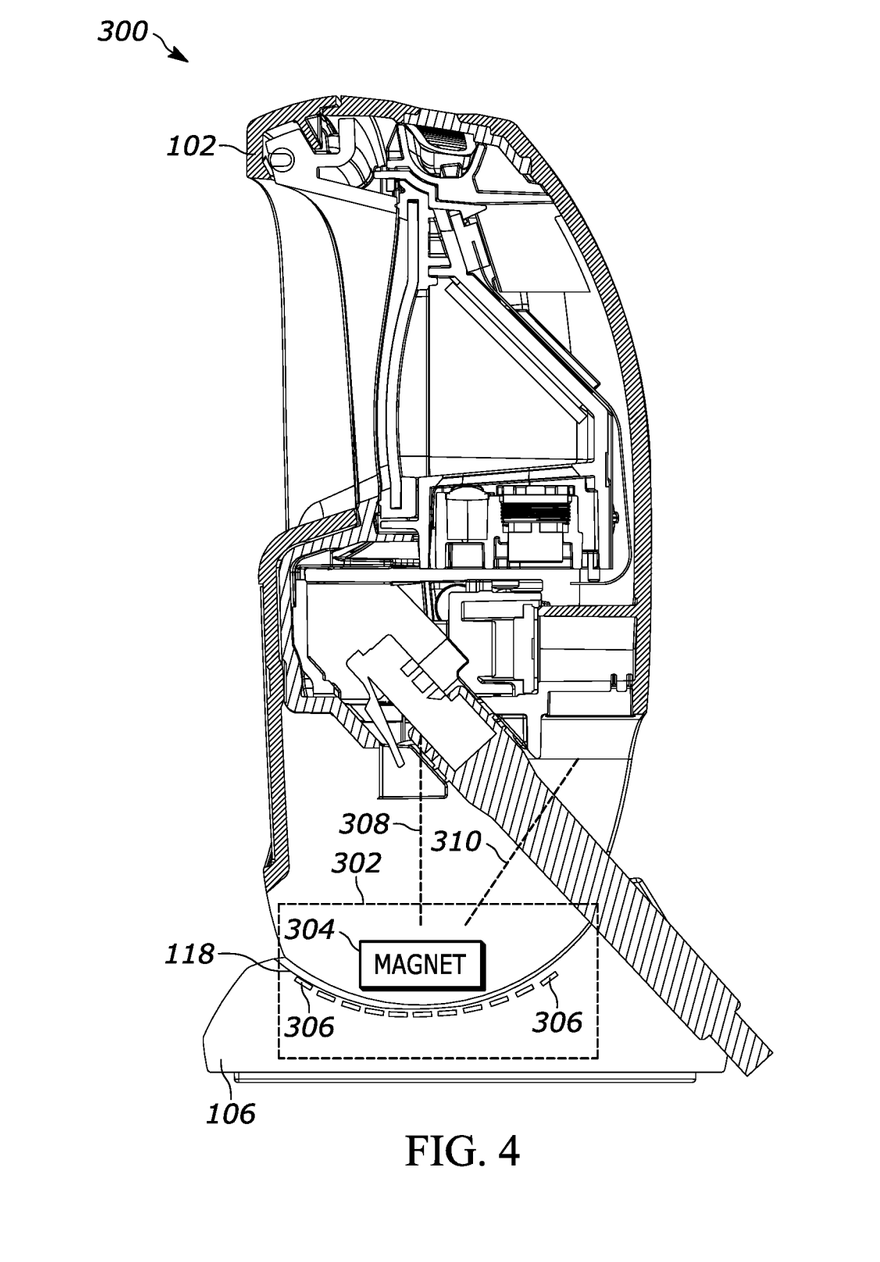
FIG. 4 illustrates a cross-sectional view of another scanning device assembly in accordance with a third example of the present disclosure.

FIG. 4 illustrates a cross-sectional view of another scanning device assembly 300 in accordance with a third example of the present disclosure. The scanning device assembly 300 of FIG. 4 is similar to the scanning device assembly 100 of FIG. 2 and the scanning device assembly 200 of FIG. 3. In contrast, the scanning device assembly 300 of FIG. 4 includes a magnetic rotational coupling 302 having a first magnet 304 carried by the scanning device 102 and a plurality of second magnets 306 carried by the base 106. The second magnets 306 may be positioned in predefined intervals. In another example, the first magnet 304 is carried by the base 106 and the plurality of second magnets 306 are carried by the scanning device 102.

Regardless of how the magnets 304, 306 are carried, the scanning device 102 is movable (e.g., tiltable) within and/or relative to the receptacle 118 in a manner that allows for the first magnet 304 to couple with different ones of the plurality of second magnets 306 throughout a range of rotational movement of the scanning device 102. Put another way, the spaced manner in which the plurality of second magnets 306 are arranged provides a plurality of magnetically engaged, angularly differentiated positions that the first magnet 304 can couple with over a range of rotational movement of the scanning device 102. Thus, the scanning device 102 may be moved between being secured in a first position associated with a longitudinal axis of the scanning device 102 aligning with a first reference axis 308 and in a second position associated with the longitudinal axis of the scanning device 102 aligning with a second reference axis 310.

Figure 5:
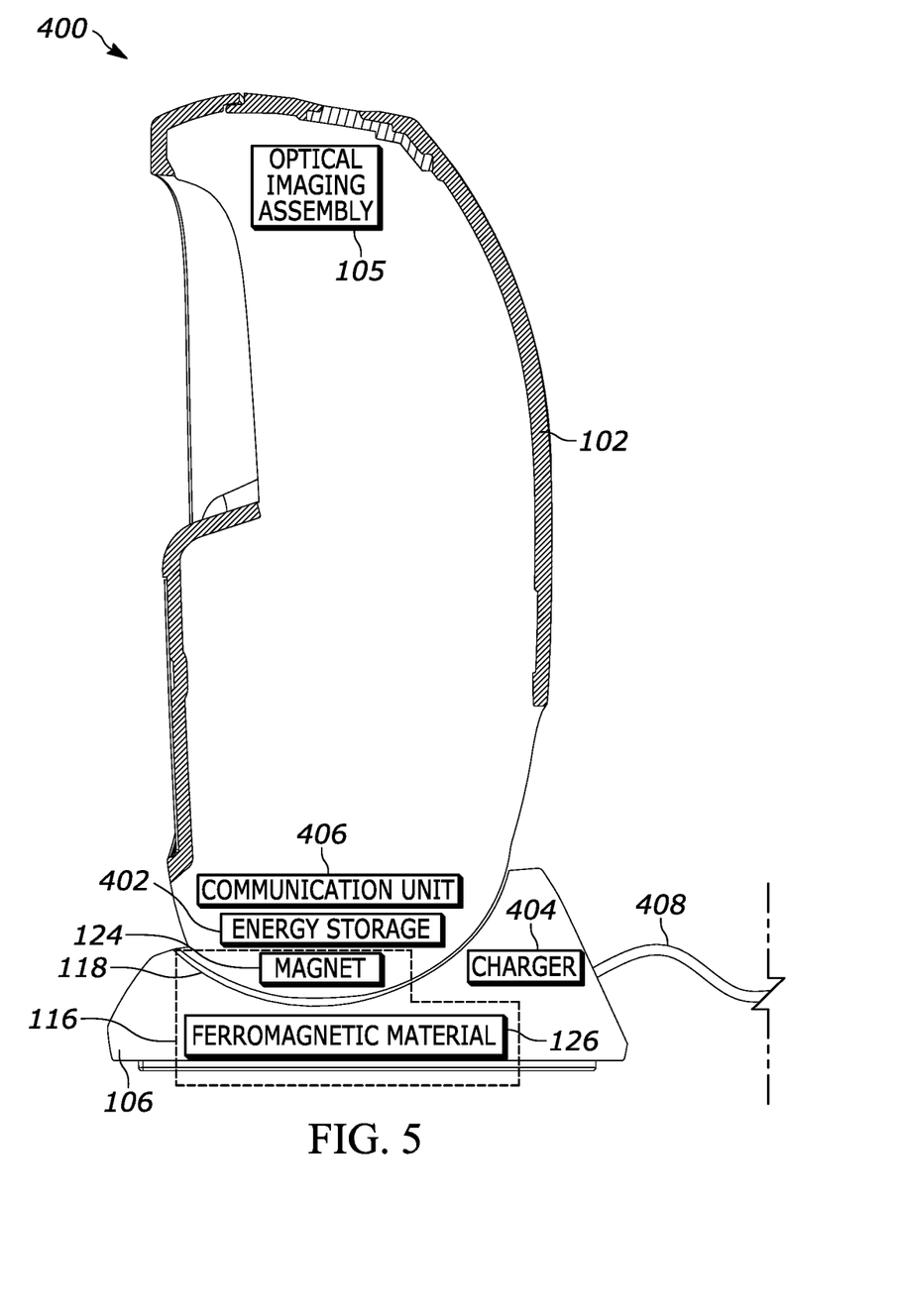
FIG. 5 illustrates a cross-sectional view of another scanning device assembly in accordance with a fourth example of the present disclosure.

FIG. 5 illustrates a cross-sectional view of another scanning device assembly 400 in accordance with a fourth example of the present disclosure. The scanning device assembly 400 of FIG. 5 is similar to the scanning device assembly 100 of FIG. 2. In contrast, the scanning device 102 of FIG. 5 includes an energy storage 402 and the base 106 of FIG. 5 includes a charger 404 that is adapted to charge the energy storage 402. The energy storage 402 may be a rechargeable battery. Other energy storage devices may prove suitable. The energy storage 402 may be coupled to the charger 404 via contacts or a conductive coupling. Other methods of charging the energy storage 402 may prove suitable.

In the example shown, the scanning device assembly 100 also includes a communication unit 406. The communication unit 406 is adapted to allow communication between the scanning device 102 and the base 106. The communication may include image data captured by the optical imaging assembly 105. The communication unit 406 may allow wireless communication between the scanning device 102 and the base 106 using, for example BLUETOOTH®, WiFi, ZIGBEE®, RFID. Other methods of communicating between the scanning device 102 and the base 106 may prove suitable.

The base 106 of the scanning device assembly 400 includes a connection cable 408. The connection cable 408 may provide power to the charger 404 and/or enable communication with the base 106 and/or the scanning device 102 via the communication unit 406. Thus, unlike some of the other scanning devices disclosed herein, the base 106 is coupled to the connection cable 408 and the scanning device 102 is not coupled to the connection cable 408.

Figure 6:
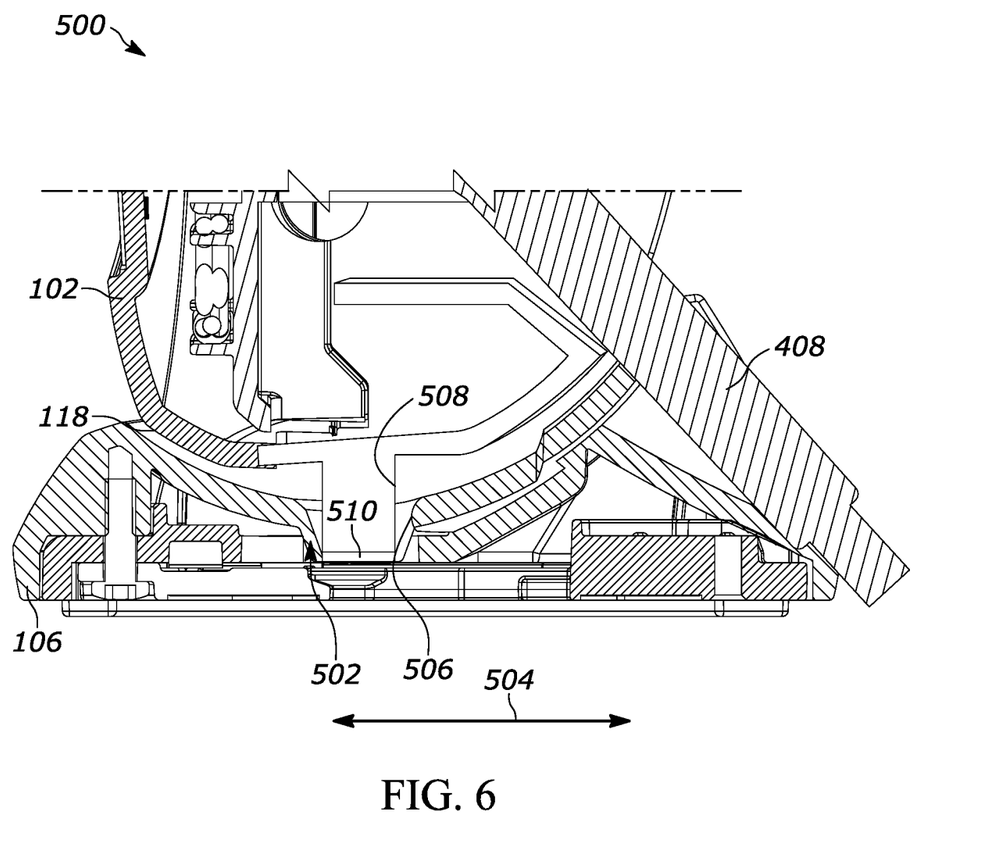
FIG. 6 illustrates a cross-sectional view of a portion of another scanning device assembly in accordance with a fifth example of the present disclosure.

FIG. 6 illustrates a cross-sectional view of a portion of another scanning device assembly 500 in accordance with a fifth example of the present disclosure. The scanning device assembly 500 of FIG. 6 is similar to the scanning device assembly 100 of FIG. 2. In contrast, the scanning device assembly 500 of FIG. 6 includes a lock 502 formed between the scanning device 102 and the base 106. The lock 502 is configured to restrict relative movement between the scanning device 102 and the base 106 in at least one direction. For example, the lock 502 may allow movement of the scanning device 102 relative to the base 106 in a direction generally indicated by arrow 504 but may restrict movement of the scanning device 102 in a direction generally perpendicular to the direction generally indicated by the arrow 504 (e.g., into the page).

In the example shown, the lock 502 includes a slot 506 and a projection 508 having a flange 510. The projection 508 and the flange 510 may form a T-shape. The slot 506 is defined by the base 106 and the projection 508 extends from the scanning device 102. In another example, the slot 506 may be defined by the scanning device 102 and the projection 508 may extend from the base 106.

To secure the base 106 relative to the scanning device 102, the flange 510 of the projection 508 is received within the slot 506 such that the flange 510 can interact with the base 106 in a manner that restricts the relative movement between the scanning device 102 and the base 106 in at least one direction. The interaction between the flange 510 and the scanning device 102 may prevent the scanning device 102 from being easily removed from the receptacle 118 of the base 106. The slot 506 may be formed as a channel having an opening that opens into the receptacle 118. The opening of the slot 506 may be adapted to receive the flange 510. Other methods of having the slot 506 receive the flange 510 may prove suitable.

In some examples, the projection 508 may be removably coupled to the scanning device 102. Removing the projection 508 from the scanning device 102 may allow the scanning device 102 to move in additional directions or otherwise have an increased range of motion. Additionally, removing the projection 508 may allow the scanning device 102 to be easily detached from the base 106.

Figure 7:
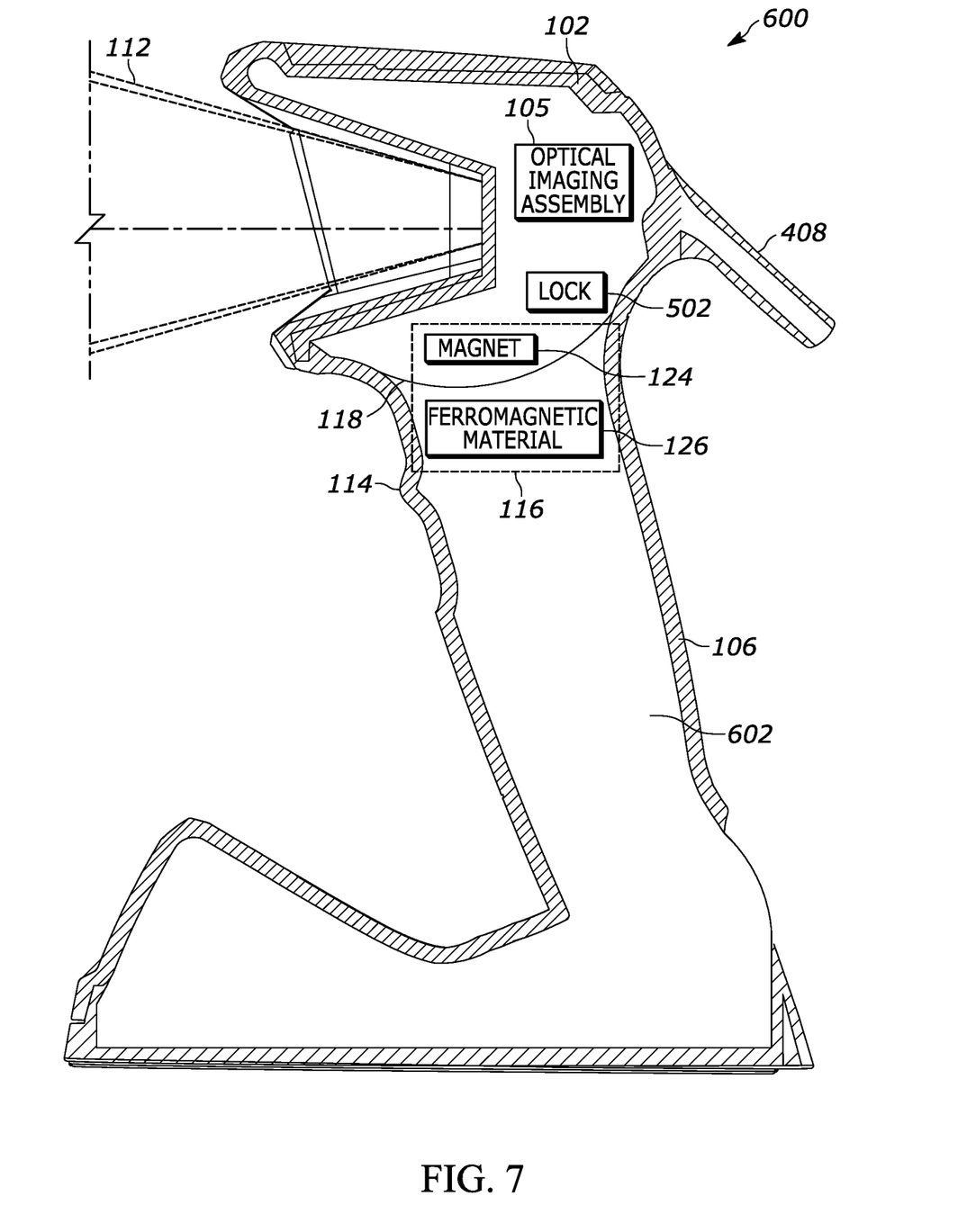
FIG. 7 illustrates a cross-sectional view of a portion of another scanning device assembly in accordance with a sixth example of the present disclosure.

FIG. 7 illustrates a cross-sectional view of a portion of another scanning device assembly 600 in accordance with a sixth example of the present disclosure. The scanning device assembly 600 of FIG. 7 is similar to the scanning device assembly 500 of FIG. 6. In contrast, the base 106 of the scanning device assembly 600 of FIG. 7 includes a handle 602 having the trigger 114. In a trigger mode of the scanning device assembly 600, the trigger 114 is actuatable to cause the optical imaging assembly 105 to capture the one or more images corresponding to the environment appearing within the FOV 112.

Figure 8:
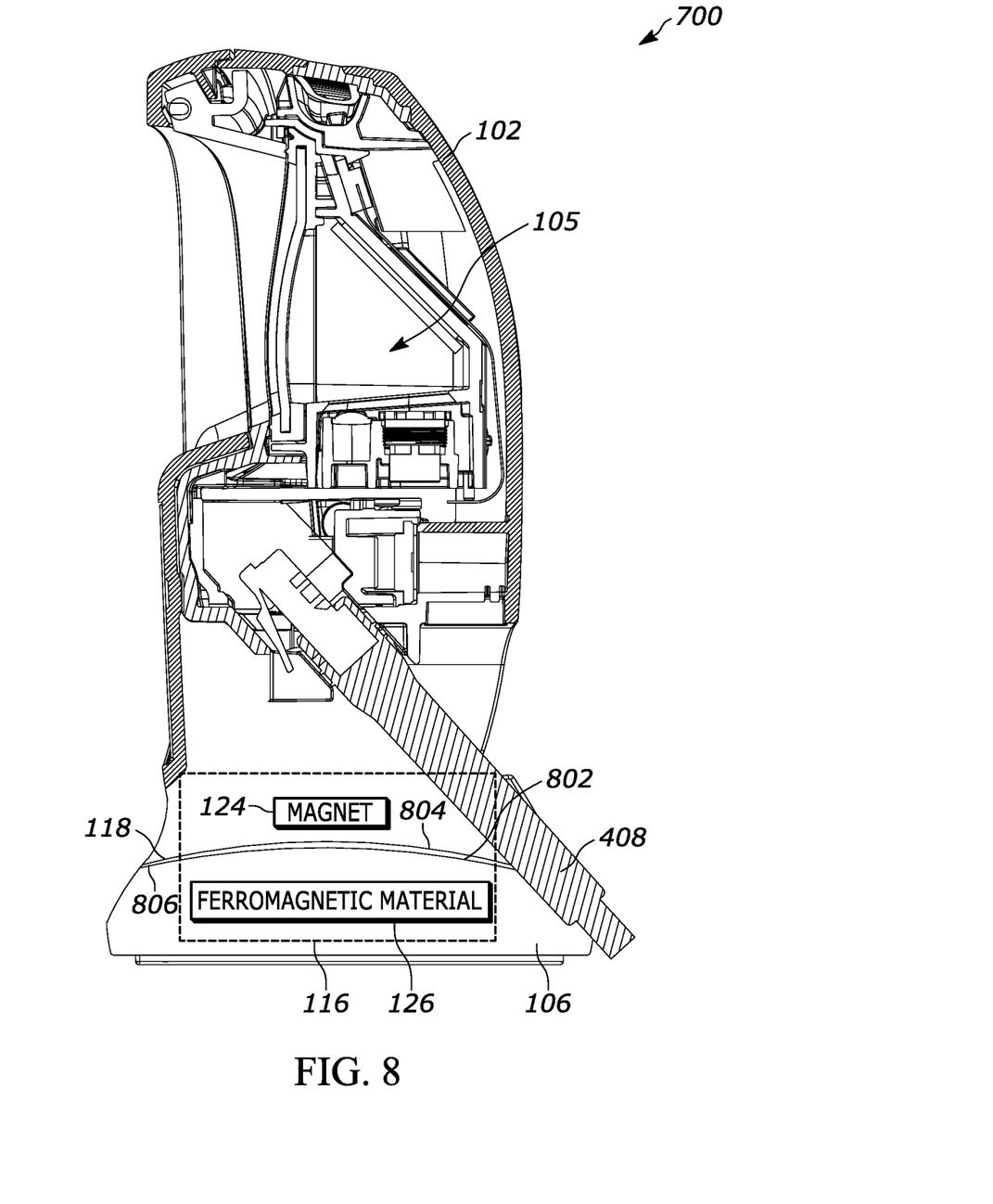
FIG. 8 illustrates a cross-sectional view of a portion of another scanning device assembly in accordance with a seventh example of the present disclosure.

FIG. 8 illustrates a cross-sectional view of a portion of another scanning device assembly 700 in accordance with a seventh example of the present disclosure. The scanning device assembly 700 of FIG. 8 is similar to the scanning device assembly 100 of FIG. 2. In contrast, the scanning device 102 of FIG. 8 defines the receptacle 118 and the base 106 includes a protrusion 802. The protrusion 802 is receivable within the receptacle 118 to mate and rotationally couple the base 106 and the scanning device 102. Thus, the scanning device 102 includes a concave surface 804 and the base 106 includes a corresponding convex surface 806.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A scanning device assembly comprising:
   a scanning device comprising:
      a housing;
      an optical imaging assembly disposed in the housing, the optical imaging assembly having an imaging field of view (FOV), the optical imaging assembly configured to capture one or more images of an environment appearing within the FOV;
   a base including a base coupling portion to mate with a housing portion of the scanning device for supporting the scanning device during operation; and
   a magnetic-rotational coupling formed between the scanning device and the base and allowing the scanning device to rotate relative to the base, while the base maintains support of the scanning device.

2. The scanning device assembly of claim 1, wherein the base coupling portion comprises a receptacle, and wherein the housing portion is receivable within the receptacle to mate and rotationally couple the base and the scanning device.

3. The scanning device assembly of claim 1, wherein the magnetic-rotational coupling comprises a magnet and a ferromagnetic material.

4. The scanning device assembly of claim 3, wherein the base carries one of the ferromagnetic material or the magnet and the scanning device carries the other of the ferromagnetic material or the magnet such that the magnetic-rotational coupling comprises the magnet and the ferromagnetic material when the scanning device mates with the base.

5. The scanning device assembly of claim 4, further comprising a sensor, the sensor being configured to generate a first signal in response to the sensor being proximate the magnet and being configured to generate a second signal in response to the sensor being distal to the magnet, further comprising a processor coupled to the sensor, wherein the processor is to cause the scanning device to be in a first operational mode in response to the processor accessing the first signal and, the processor is to cause the scanning device to be in a second operational mode in response to the processor accessing the second signal.

6. The scanning device assembly of claim 5, wherein the first operational mode is a presentation mode of the scanning device and the second operational mode is a trigger mode of the scanning device.

7. The scanning device assembly of claim 1, wherein the magnetic-rotational coupling comprises a first magnet and a plurality of second magnets, the first magnet being carried by the scanning device and the plurality of second magnets being carried by the base, wherein the first magnet is couplable with different ones of the plurality of second magnets throughout a range of rotational movement of the scanning device.

8. The scanning device assembly of claim 1, wherein the magnetic-rotational coupling comprises a first magnet and a plurality of second magnets, wherein the plurality of second magnets are positioned in a spaced manner to provide a plurality of magnetically engaged, angularly differentiated positions couplable with the first magnet over a range of rotational movement of the scanning device.

9. The scanning device assembly of claim 1, wherein the scanning device comprises an energy storage and the base comprises a charger, the charger being adapted to charge the energy storage.

10. The scanning device assembly of claim 9, further comprising a communication unit, the communication unit being configured to allow communication between the scanning device and the base.

11. The scanning device assembly of claim 1, further comprising a lock formed between the scanning device and the base, the lock configured to restrict relative movement between the scanning device and the base in at least one direction.

12. The scanning device assembly of claim 11, wherein the lock comprises a slot and a projection having a flange, the flange being receivable within the slot to selectively secure the base and the scanning device.

13. The scanning device assembly of claim 12, wherein the scanning device comprises the projection and the base comprises the slot.

14. The scanning device assembly of claim 1, wherein the base comprises a handle having a trigger, in a trigger mode of the scanning device, the trigger is actuatable to cause the optical imaging assembly to capture the one or more images corresponding to the environment appearing within the FOV.

15. The scanning device assembly of claim 1, wherein the housing portion comprises a receptacle and the base coupling portion comprises a protrusion, and wherein the protrusion is receivable within the receptacle to mate and rotationally couple the base and the housing.

16. A barcode reader assembly for capturing at least one image of an object appearing in a field of view (FOV), the barcode reader assembly comprising:
    a barcode reader;
    a stand adapted to nest with the barcode reader; and
    a magnetic coupling formed between the barcode reader and the stand, the barcode reader being magnetically coupled to the stand such that the barcode reader is rotatable relative to the stand.

17. The barcode reader assembly of claim 16, wherein the stand comprises a concave-shaped surface and the barcode reader comprises a convex-shaped surface, the concave-shaped surface being adapted to receive the convex-shaped surface.

18. The barcode reader assembly of claim 16, wherein the magnetic coupling comprises at least one of a magnet and a ferromagnetic material carried by the barcode reader and the stand.

19. The barcode reader assembly of claim 16, wherein the magnetic coupling comprises a magnet or a ferromagnetic material carried by the barcode reader and the other of the magnet or the ferromagnetic material carried by the stand, further comprising a sensor configured to generate a first signal in response to the sensor being proximate the magnet and being configured to generate a second signal in response to the sensor being distal to the magnet, further comprising a processor coupled to the sensor, in response to the processor accessing the first signal, the processor being configured to cause the barcode reader to be in a first operational mode and, in response to the processor accessing the second signal, the processor being configured to cause the barcode reader to be in a second operational mode.

20. The barcode reader assembly of claim 16, wherein the magnetic coupling comprises a first magnet and a plurality of second magnets, the first magnet being carried by one of the barcode reader and the stand and the plurality of second magnets being carried by the other of the barcode reader and the stand, wherein movement of the barcode reader relative to the base allows the first magnet to couple with different ones of the plurality of second magnets to change the rotational position of the barcode reader.

* * * * *